US 9,098,764 B2

(12) United States Patent
Gallo et al.

(10) Patent No.: US 9,098,764 B2
(45) Date of Patent: Aug. 4, 2015

(54) IMAGE-BASED BARCODE READER

(75) Inventors: Orazio Gallo, Santa Cruz, CA (US);
Roberto Manduchi, Santa Cruz, CA (US)

(73) Assignee: The Regents of the University of California, Oakland, CA (US)

(*) Notice: Subject to any disclaimer, the term of this patent is extended or adjusted under 35 U.S.C. 154(b) by 237 days.

(21) Appl. No.: 13/138,982

(22) PCT Filed: Jul. 15, 2010

(86) PCT No.: PCT/US2010/002023
§ 371 (c)(1),
(2), (4) Date: Nov. 9, 2011

(87) PCT Pub. No.: WO2011/011051
PCT Pub. Date: Jan. 27, 2011

(65) Prior Publication Data
US 2012/0104100 A1 May 3, 2012

Related U.S. Application Data

(60) Provisional application No. 61/271,432, filed on Jul. 20, 2009.

(51) Int. Cl.
| G06K 7/10 | (2006.01) |
| G06K 9/38 | (2006.01) |
| G06K 9/00 | (2006.01) |
| G06K 9/62 | (2006.01) |

(52) U.S. Cl.
CPC ........ G06K 7/10851 (2013.01); G06K 7/10712 (2013.01); G06K 9/0055 (2013.01); G06K 9/00543 (2013.01); G06K 9/6206 (2013.01)

(58) Field of Classification Search
CPC ......... G06K 7/10851; G06K 7/10712; G06K 9/0055; G06K 9/00543; G06K 9/6206
See application file for complete search history.

(56) References Cited

U.S. PATENT DOCUMENTS

| 5,367,578 | A | * | 11/1994 | Golem et al. ................. 382/183 |
| 5,373,147 | A | * | 12/1994 | Noda ........................ 235/462.08 |
| 5,486,689 | A | * | 1/1996 | Ackley ...................... 235/462.16 |
| 5,742,037 | A | * | 4/1998 | Scola et al. .................... 235/454 |
| 6,006,990 | A | * | 12/1999 | Ye et al. ........................ 235/454 |
| 6,082,619 | A | * | 7/2000 | Ma et al. .................... 235/462.1 |
| 6,655,592 | B2 | * | 12/2003 | Shaked et al. ........... 235/462.01 |
| 7,566,004 | B2 | * | 7/2009 | He et al. ........................ 235/385 |
| 8,733,650 | B1 | * | 5/2014 | Segal et al. ................... 235/437 |
| 2001/0025886 | A1 | * | 10/2001 | He et al. .................... 235/462.25 |
| 2002/0020747 | A1 | * | 2/2002 | Wakamiya et al. ...... 235/462.11 |
| 2002/0084330 | A1 | * | 7/2002 | Chiu ........................ 235/462.11 |
| 2005/0199721 | A1 | | 9/2005 | Chang et al. |
| 2009/0212113 | A1 | * | 8/2009 | Chiu et al. ............... 235/462.41 |
| 2010/0142795 | A1 | * | 6/2010 | Crockett ....................... 382/140 |
| 2010/0187311 | A1 | * | 7/2010 | van der Merwe et al. ........................ 235/462.01 |

(Continued)

FOREIGN PATENT DOCUMENTS

EP 0449634 10/1991

*Primary Examiner* — Daniel Walsh
(74) *Attorney, Agent, or Firm* — Lumen Patent Firm

(57) ABSTRACT

Barcode decoding bypassing binarization is provided which relies on deformable templates to makes use of all the gray level information of each pixel in the barcode image. Parameterization of the deformable templates allow for efficiently performing maximum likelihood estimation independently on each barcode digit and enforcing spatial coherence across the barcode digits.

5 Claims, 13 Drawing Sheets

(56) References Cited

U.S. PATENT DOCUMENTS

| | | | |
|---|---|---|---|
| 2010/0189367 A1* | 7/2010 | van der Merwe et al. | 382/217 |
| 2011/0068173 A1* | 3/2011 | Powers et al. | 235/462.06 |
| 2012/0080515 A1* | 4/2012 | van der Merwe | 235/375 |
| 2012/0091204 A1* | 4/2012 | Shi | 235/437 |
| 2013/0068841 A1* | 3/2013 | Santosa et al. | 235/462.1 |
| 2013/0170765 A1* | 7/2013 | Santos et al. | 382/255 |
| 2013/0256416 A1* | 10/2013 | Wang et al. | 235/462.08 |

* cited by examiner

FIG. 1A
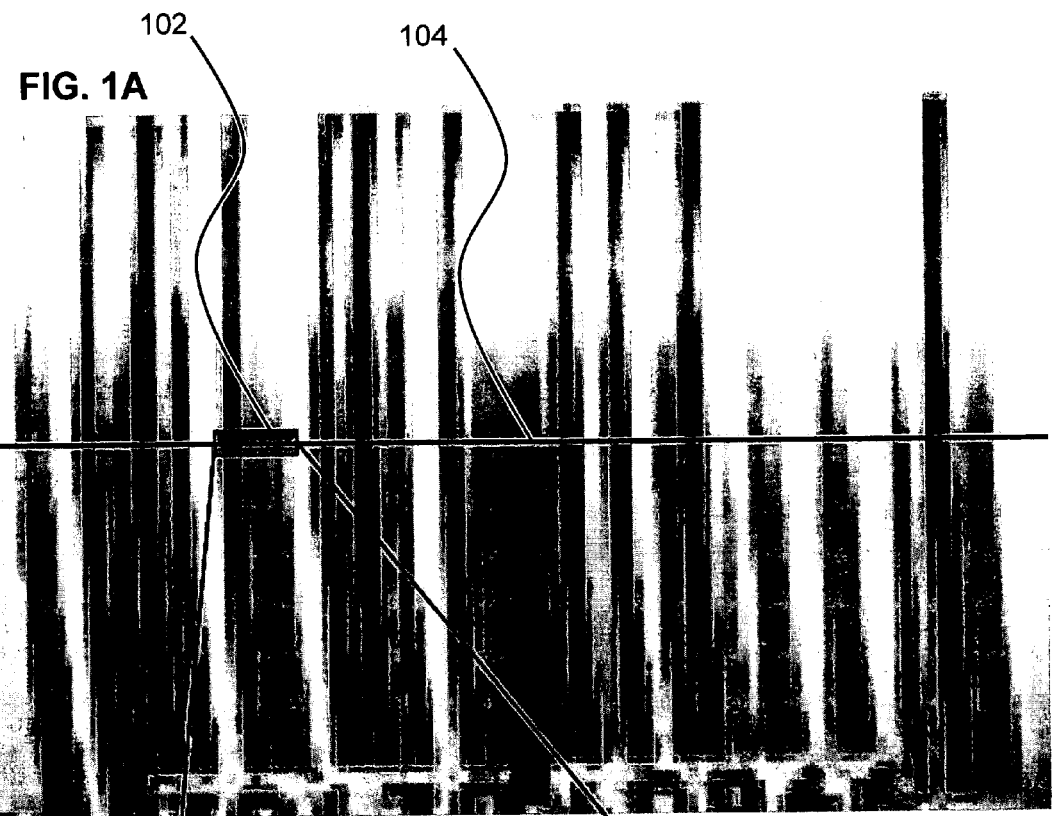
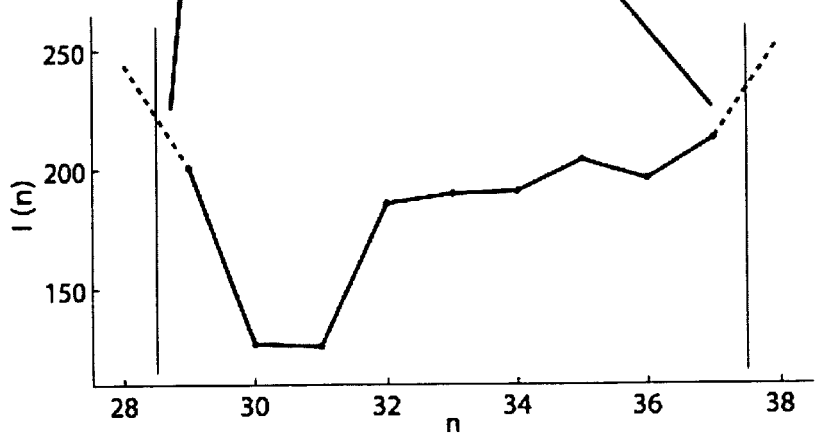
FIG. 1B
FIG. 1C

IMAGE-BASED BARCODE READER

CROSS-REFERENCE TO RELATED APPLICATIONS

This application is a 371 of PCT Patent Application PCT/US2010/002023 filed 7/15/2010, which claims the benefit of US Provisional Application 61/271,432 filed Jul. 20, 2009.

FIELD OF THE INVENTION

The invention relates barcode readers. In particular, the invention relates to image-based barcode readers.

BACKGROUND OF THE INVENTION

Today, virtually every item on the market is labeled with at least one form of barcode, generally a flavor of either the EAN or the UPC standards. The success of barcode technology for identification, tracking, and inventory derives from its ability to encode information in a compact fashion with low associated cost.

Barcode reading via dedicated scanners is a mature technology. Commercial laser-based hand-held barcode scanners achieve robust reading with a reasonable price tag. Recently, there has been growing interest in accessing barcodes also with regular cellphones, without the need for a dedicated device. Indeed, a number of cellphone applications (apps) have appeared that provide access via barcode reading to the full characteristics of and user reviews for a product found at a store.

Unfortunately, images taken by cellphone cameras are often of low quality. Many cellphone cameras on the market are equipped with low-grade lenses, often lacking focusing capability, which often produce blurred images. Few cellphones have a flash and, therefore, motion blur and noise can be expected with low ambient light. All of these factors, possibly combined with low image resolution, make barcode reading difficult in certain situations. Indeed, all existing image-based barcode readers have limited performance when it comes to images taken in difficult light conditions, or when the camera is not close enough to the barcode. To improve accuracy, barcode reading apps usually prompt the user to precisely position the camera to ensure that the barcode covers as much of the frame as possible. This operation can be somewhat bothersome, as it requires a certain amount of interaction with the user, who needs to frame the barcode correctly using the viewfinder.

This invention presents new techniques for barcode reading advancing the art and overcoming at least some of the current problems or shortcomings with existing barcode reading techniques.

SUMMARY OF THE INVENTION

The present invention provides an approach to barcode reading that never needs to binarize the image. Instead, deformable barcode digit models are used in a maximum likelihood setting. It is shown that the particular nature of these models enables efficient integration over the space of deformations. Global optimization over all digits is then performed using dynamic programming.

Embodiments of the invention can be implemented as a computer-implemented method with steps to perform to at least some of the method steps of the invention. Embodiments of the invention can also be a digital storage medium tangibly embodying machine-readable instructions executable by a processor or computer, whereby the instructions relate to at least some of the method steps (or computer instructions) of the invention. Embodiments of the invention can also be a device such a microprocessor or chip capable of receiving the barcode image and processing the image according to embodiments of the invention. Embodiments of the invention can also be a system of a camera (e.g. standard camera or any mobile device with a camera such as a smart phone) with a barcode reader system embodying at least some of the elements of the invention. It is noted that embodiments of the invention can be applied to any type of barcode and are not limited to a particular type. Furthermore, the invention could also be used for images other than barcodes such as fixed patterns of black and white geometrical shapes in specific arrangements.

BRIEF DESCRIPTION OF THE DRAWINGS

FIGS. 1A-C show according to an embodiment of the invention an example of a challenging barcode image (1A) that was correctly decoded. Our algorithm is able to decode a barcode without requiring the user to precisely frame it within the viewfinder. A scanline, the sequence of brightness levels in a given row of the image, is indicated in 104. The segment of the scanline highlighted in 102 is plotted in (1B). The underlying sequence of spaces and bars is shown in (1C). Note how blur and low resolution affect the intensity profile. A system that binarizes the intensity would be hard-pressed to detect the correct pattern.

$$dw = -\frac{1}{2+1+2}do + q.$$

The final partition is shown in plot (5A). Intuitively, if $(o_1, w_1)$ and $(o_2, w_2)$ fall within the same 2+1+2 cell of plot (5A), the conditional likelihoods $p_2(I|o_1, w_1)$ and $p_2(I|o_2, w_2)$ are identical. In other words, instead of computing the integral in Eq. (11) over every point of the space, the problem can be made tractable by only considering one point per cell without introducing any approximation.

Figure 6:
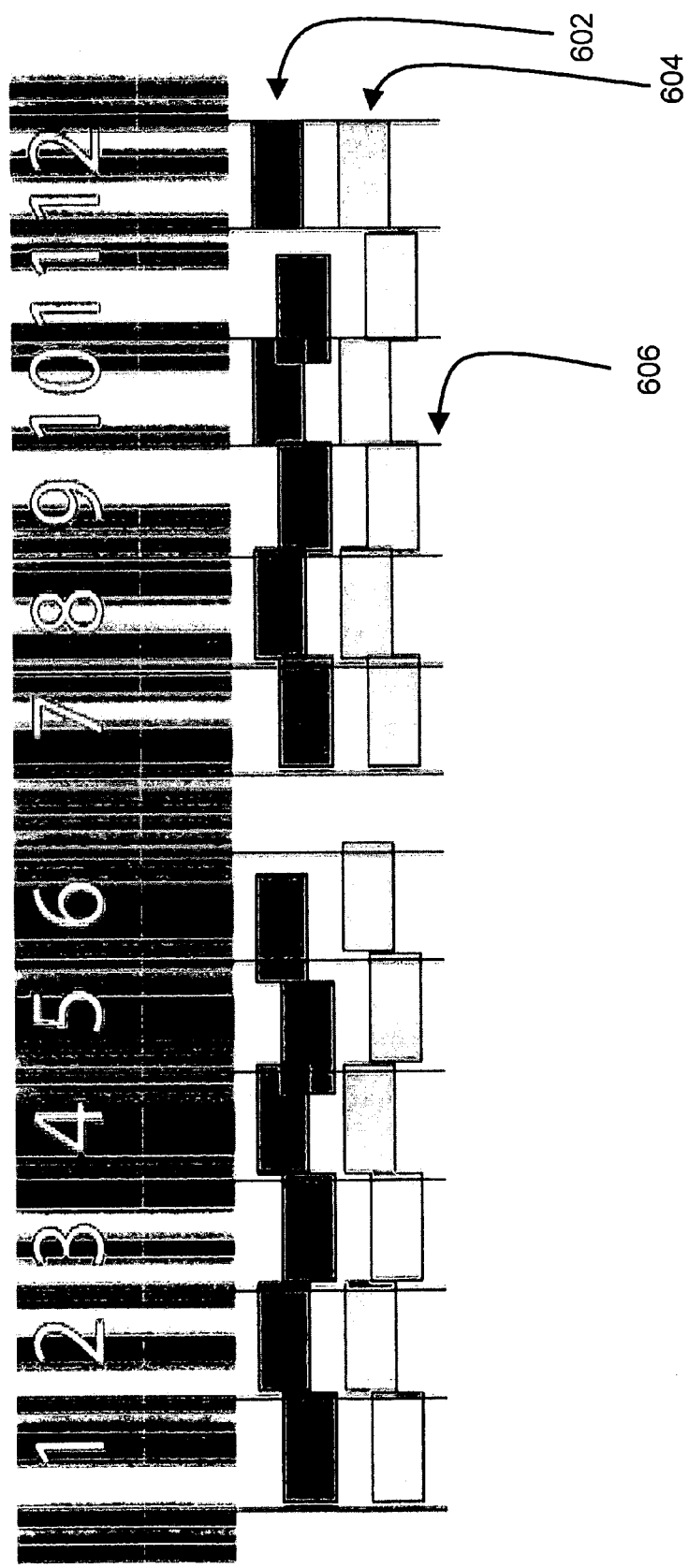

FIG. 6 shows according to an embodiment of the present invention the support segments $[\overline{o}_{j,k(j)}, \overline{o}_{j,k(j)} + 7\overline{w}_{j,k(j)}]$, where k(j) are the maximizers of the total likelihood $p_j,k(j)(I)$ for each digit index j, are shown by 602 against the support segments corresponding to the sequence of values {k} minimizing the global cost C in Eq. (17), shown by 604. Digits 5, 6, and 11 are not correctly decoded and their position is therefore miscalculated (602). The algorithm described herein successfully enforces global consistency and, thus, correct decoding (604). Lines 606 (only indicated one line by 606 but intended to represent similar lines through the barcode) represent the original digit segments, obtained from Eq. (5)-(6). To provide a visual intuition of the intensity profile of the scanline under consideration, the latter was repeated vertically to form a graylevel image.

DETAILED DESCRIPTION

One of the key differentiators of the approach is that it never binarizes the image or performs edge extraction operations. Virtually any existing algorithm for barcode reading performs some sort of binarization of the input brightness data. We argue that this early-commitment operation translates into unrecoverable information loss, which makes the reader susceptible to noise, blur, and low resolution. This is especially the case for low-resolution images, where binarization errors may have catastrophic effects.

For example, FIG. 1 shows a challenging barcode which would be hardly read by a binarization-based approach. FIG. 1C shows an example of an ideal alternation of black and white bars. Samples 32, 33, and 34 from the scanline in FIG. 1B are monotonically non-decreasing while they should correspond to the second, third, and fourth bars in FIG. 1C, which would ideally be represented by a sample above threshold, one below, and one above again.

In contrast to previous approaches, our approach uses the full gray-level information through-out its most critical stages. We employ a particular form of deformable template matching that produces robust results even in difficult situations, such as the one shown in FIG. 1. We shift and scale the archetypal models of each individual barcode digit (FIG. 3) to match the measured brightness profile in a maximum likelihood framework. Although deformable template matching usually requires computationally expensive optimization techniques, we show that in the case of these patterns, matching can be obtained exactly with a discrete search over a few dozens points. In addition, we describe an optimization procedure to enforce spatial coherence of the individual digits found by deformable template matching.

In one embodiment, the decoding technique requires that the barcode has been localized with fairly good precision (e.g. within twice the width of the base width, that is, the smallest possible bar in the barcode). This operation is facilitated by the fact that a barcode is bordered to the side by a quiet (white) area whose size is prescribed by the standard.

Barcode Reader

Given an image containing a barcode, two distinct operations are needed for accessing the information contained in the barcode: localization and decoding. Localization typically relies on the strong textural content of the barcode, without the need to exactly measure and interpret the width distribution of the bars. Decoding can be performed on one or more scanlines. Throughout this description we make use of the following definitions (see the Appendix for a more complete description of the terminology). A UPC-A barcode encodes 12 symbols (0-9). Each of the consecutive, non-overlapping segments which encode the symbols are called barcode digits segments or simply digits. For instance, in the barcode shown in FIG. 1, the symbol encoded in the second digit is '4'. Note that each symbol is encoded by two white and two black bars.

A. Barcode Localization

The localization algorithm provides the decoding algorithm with a scanline, where the barcode's endpoints have been localized as accurately as possible. In principle, any reliable algorithm for localization could be used. However we have found out that the algorithm presented herein provides excellent results even in challenging situations. Note that, contrary to approaches that assume that the barcode is in the center of the captured frame our method only requires that the barcode be completely visible.

In one embodiment our localization algorithm assumes that the digital image of the barcode is captured with the camera oriented so that its vertical axis is approximately parallel to the bars. Thus, in correspondence of a barcode, one should expect an extended region characterized by strong horizontal gradients and weak vertical gradients. Accordingly, we first compute the horizontal and vertical derivatives, $I_x(n)$ and $I_y(n)$, at each pixel n. We then combine them together in a non-linear fashion as by $$I_e(n) = |I_x(n)| - |I_y(n)|. \qquad (1)$$

Figure 2A:
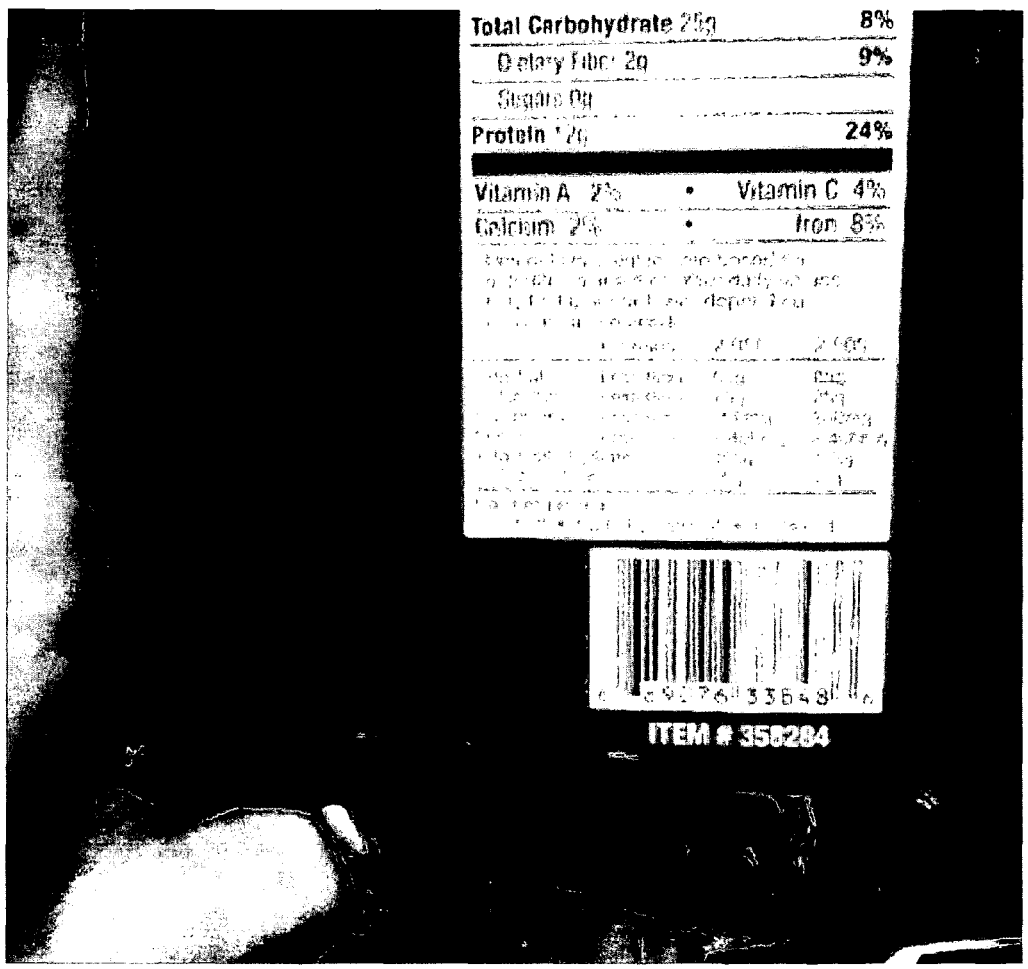
FIGS. 2A-D show according to an embodiment of the present invention an example of the barcode localization method. 2A shows an original digital image including a barcode. 2B shows an example of a smoothed map $I_s(n)$ with its maximum marked by a black square. 2C shows an example of binarization by thresholding of $I_s(n)$. 2D shows an example of the resulting rectangular segment (black square), along with the selected scanline $l(n)$, the intersection points $i_L$ and $i_R$, and the endpoints $o_L$ and $o_R$.
Figure 2B:
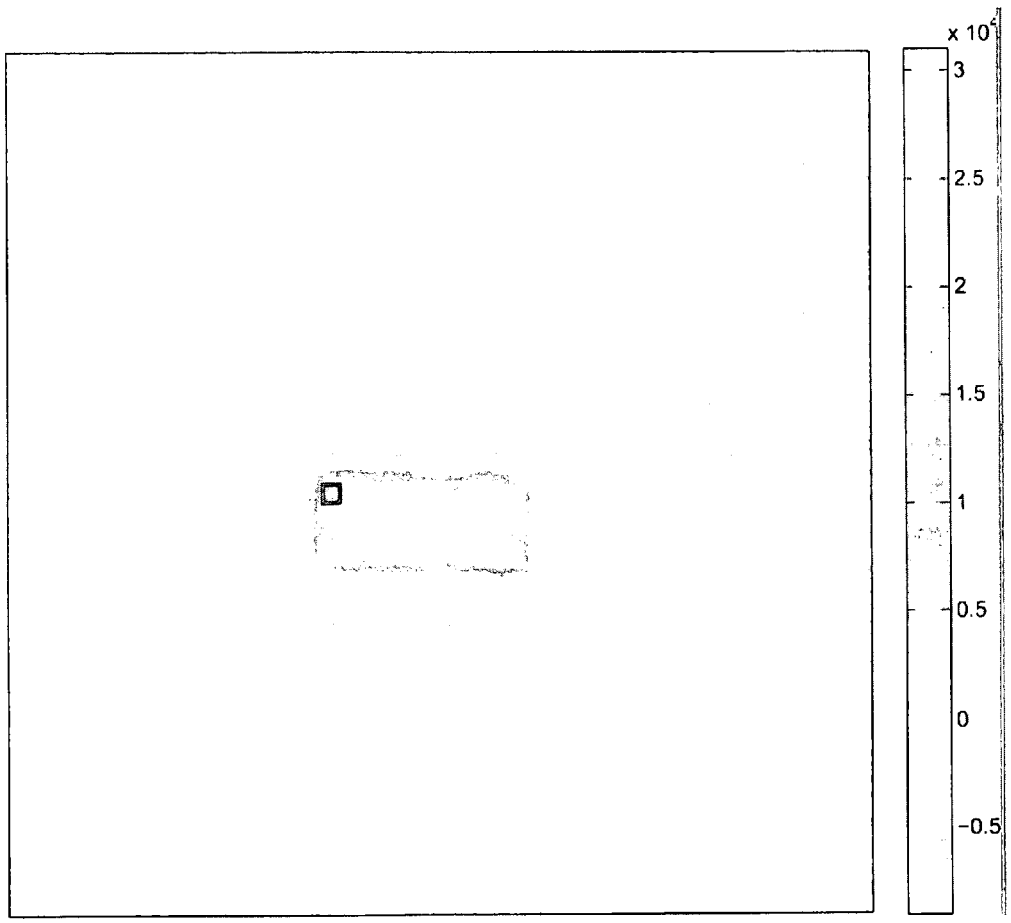
Figure 2C:
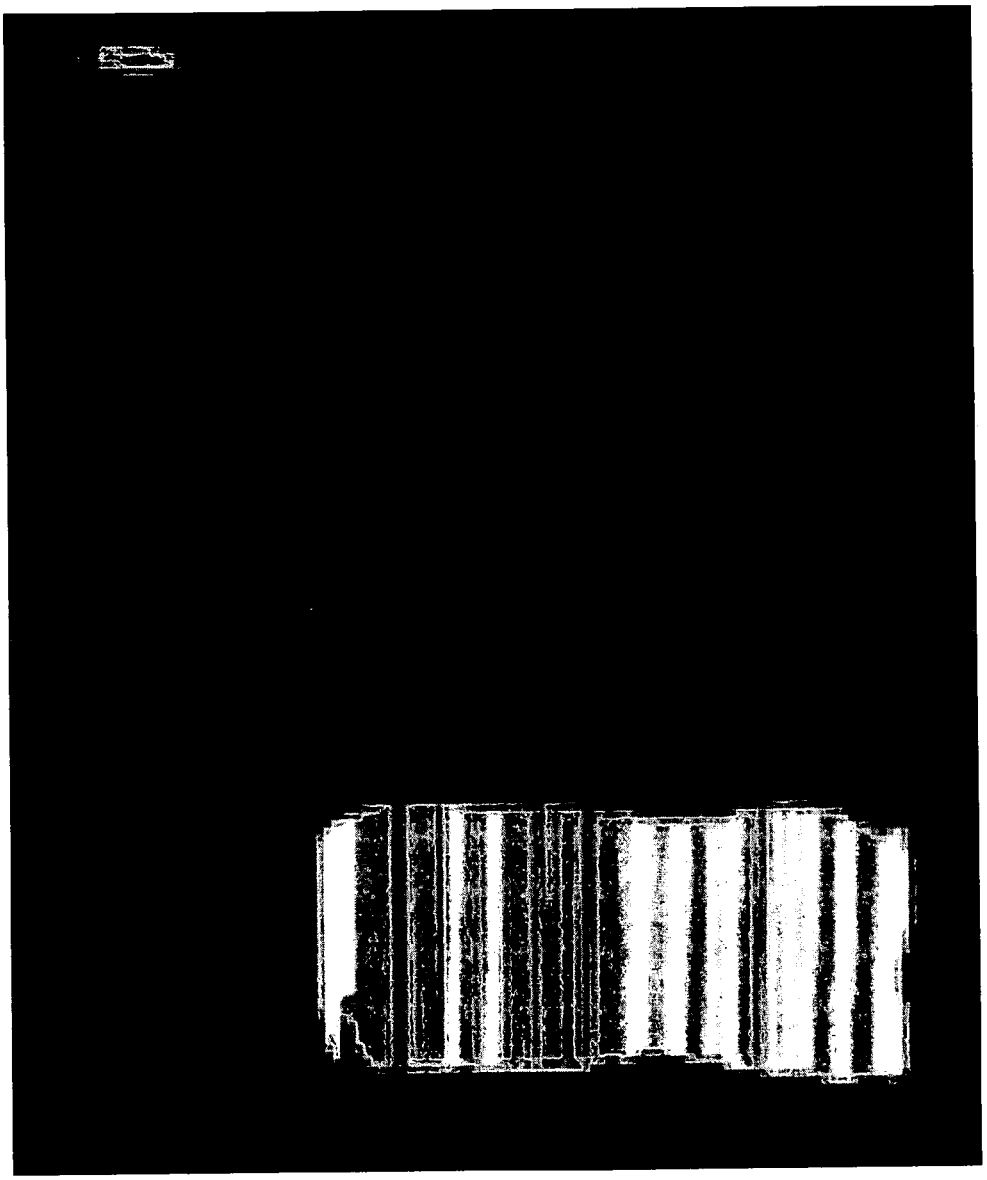
Figure 2D:

It is reasonable to assume that many points within a barcode should have a large value of $I_e(n)$. We run a block filter over $I_e(n)$, obtaining the smoothed map $I_s(n)$. The size of the filter was chosen based on the range of the size of the input images and the minimum size of the barcode readable by our method. Note that block filtering can be implemented efficiently so that only few operations per pixel are required. Finally, we binarize $I_s(n)$ with a single threshold, selected using the method proposed by Otsu (N. Otsu. *A threshold selection method from gray-level histograms. IEEE Transactions on Systems, Man, and Cybernetics,* 9(1): 62-6, 1979). The thresholding operation allows to neglect most of the image but might, in general, detect more than one region in the image as barcode candidate, with the correct region being in general the largest (FIG. 2C). Rather than computing the connected components of the thresholded map and retaining the largest, we select the pixel $n_0$ that maximizes $I_s(n)$, under the assumption that the correct region, i.e. the one corresponding to the barcode, contains such pixel. In our experiments, this assumption was always found to be correct. Then, we expand a vertical and a horizontal line from $n_0$, and form a rectangle with sides parallel to the axes of the image and containing the intersections of these lines with the edge of the region. The horizontal line l(n) that passes through the center of this rectangle is chosen as the scanline for the analysis. Note that the leftmost and rightmost bars of a barcode are bordered by a quiet zone, a white region around the barcode which facilitates localization (see Appendix). The quiet zone, along with the large size of the block filter, ensures that the vertical sides of this rectangle fall outside the area of the barcode by at least a few pixels. Therefore, to localize the endpoints $o_L$ and $o_R$ of the barcode, we first determine the intersections $i_L$ and $i_R$ of the scanline l(n) with the rectangle and then, the rectangle being larger than the actual barcode, we proceed inwards from each end (see FIG. 2(d)). In one example, we stop when we find a value that is less than 85% of the average luminance from the intersection points to the current pixels:

$$o_L : l(o_L) < 0.85 \cdot \frac{\sum_{n=i_L}^{o_L-1} l(n)}{o_L - i_L - 1} \quad (2)$$

and $$o_R : l(o_R) < 0.85 \cdot \frac{\sum_{i_R}^{n=o_R+1} l(n)}{i_R - o_R + 1}. \quad (3)$$

Although this example of the algorithm relies on the assumption that the bars of the barcode are approximately vertical in the image, our studies have shown that the map $I_e(n)$ can be segmented even when this assumption is not satisfied. Indeed, as long as the barcode's bars are slanted by an angle smaller than 45°, the segmentation algorithm usually succeeds. However, it is noted that this example of the algorithm only uses horizontal scanlines for decoding and requires that all bars of a barcode be intersected by one such scanline. Due to the aspect ratio of typical barcodes, for this embodiment this adds the requirement that the bars form an angle no larger than 30° from the vertical.

B. Barcode Decoding

In one embodiment our decoding algorithm analyzes a single scanline extracted from the detected barcode area as described supra. The only requirement is that the beginning and the end of the barcode pattern in the scanline are detected with a certain accuracy. In our implementation we assume a localization tolerance in either end point equal to twice the width of the narrowest bar.

B.1. Algorithm Outline

Figure 3:
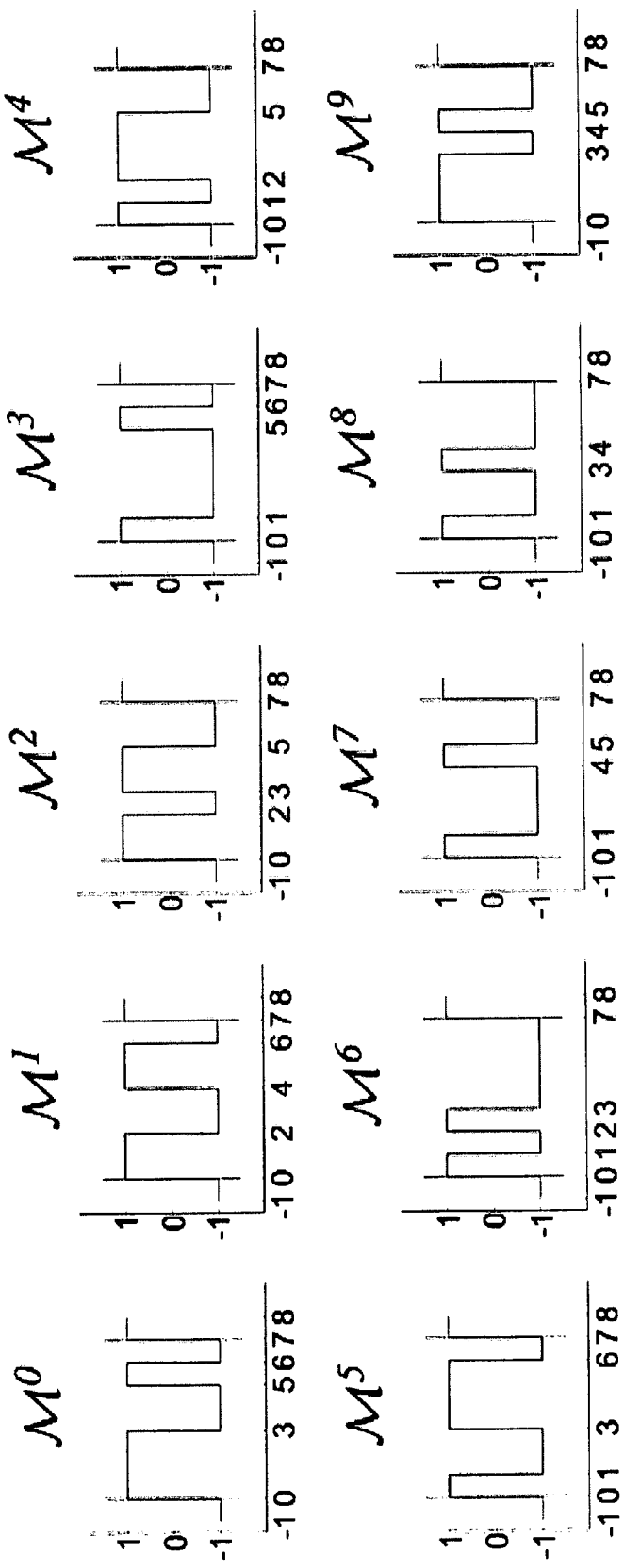
FIG. 3 shows according to an embodiment the present invention each digit in a UPC-A code is encoded with a sequence of two bars and two spaces, represented in these graphs by values of 1 and −1.

First, based on the previously detected endpoints of the scanline, we compute the spatial location of each digit segment in the barcode. As described in the Appendix, these digits are encoded independently of each other and occupy contiguous, non-overlapping intervals on the scanline. For each of the 12 digits in the barcode, we compare the intensity profile of the corresponding segment of the scanline with binary templates, each representing a symbol as shown in FIG. 3. To account for inaccuracy in the localization of the spatial extent of each digit, we allow these templates to shift and scale in the horizontal direction. We then define a likelihood function to measure how well a deformed (shifted and scaled) template explains the observed intensity. A possible strategy could be to search for the deformation parameters that maximize the likelihood, i.e. the shifted and scaled template that best explains the data, hoping to avoid the many existing local maxima. Rather than focusing on a single deformation, we integrate the likelihood over the space of deformations, having defined a prior distribution of the deformation parameters. The solution thereto has been shown to compute this integral exactly and in affordable computing time.

Independent likelihood maximization over each digit segment produces a sequence of symbols. However, the result of this operation may be incorrect due to noise, blur or other causes. The risk of such errors can be reduced by exploiting global constraints on the overall sequence of symbols. The idea is that the "optimal" sequence of deformed templates should not present overlaps or gaps. We define a global cost function that, for each possible sequence of symbols, penalizes overlaps or gaps in the sequence of deformed templates, with the deformation parameters obtained by least squares regression. The minimum cost sequence can then be found via dynamic programming. We now describe in detail each of the steps of this procedure.

Deformable Models

We define a barcode model (or barcode template) $\mathcal{M}^k$ for a given symbol k as a continuous piecewise constant function that alternates between −1 and 1, where a value of −1 (1) represents a black (white) bar (see FIG. 3). A model $\mathcal{M}^k$ for a symbol in the left half of a UPC-A barcode begins with a '−1' segment and ends with a '1' segment, where both such segments have length of 1. The lengths of the i-th constant segment between these two end segments is equal to the module width rik (as defined in the Appendix). A model is therefore an archetypical representation of one symbol of a standardized scanline, plus one bar from each one of the nearby symbols. These two additional bars have base width and known polarity; adding such bars to the template increases robustness of the matching process.

Figure 4:
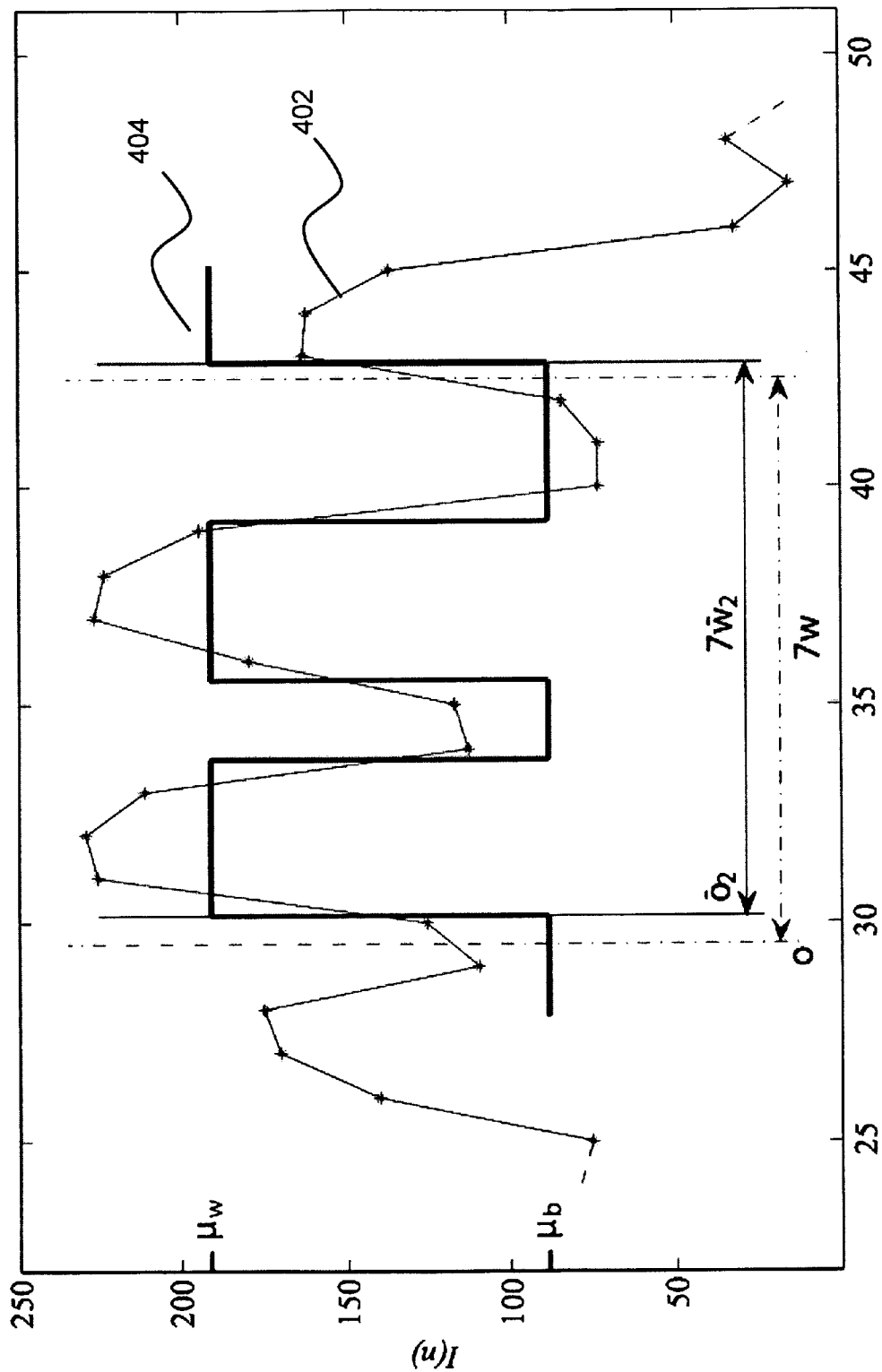
FIG. 4 shows according to an embodiment of the present invention a sample of intensity profile in a scanline 402. The segment [o, o+7w] represents the location of the initial digit segment obtained from Eq. (5)-(6), whereas the segment [$\bar{o}_2$, $\bar{o}_2 + 7\bar{w}_2$] is the estimated support segment as by Eq. (15) for k=2. The line 404 represents the deformed model $\mathcal{M}_{\bar{o}_2,\bar{w}_2}^2$. For the sake of graphical clarity, the model was scaled in amplitude so that it alternates between $\mu_b$ and $\mu_w$.
Figure 5A:
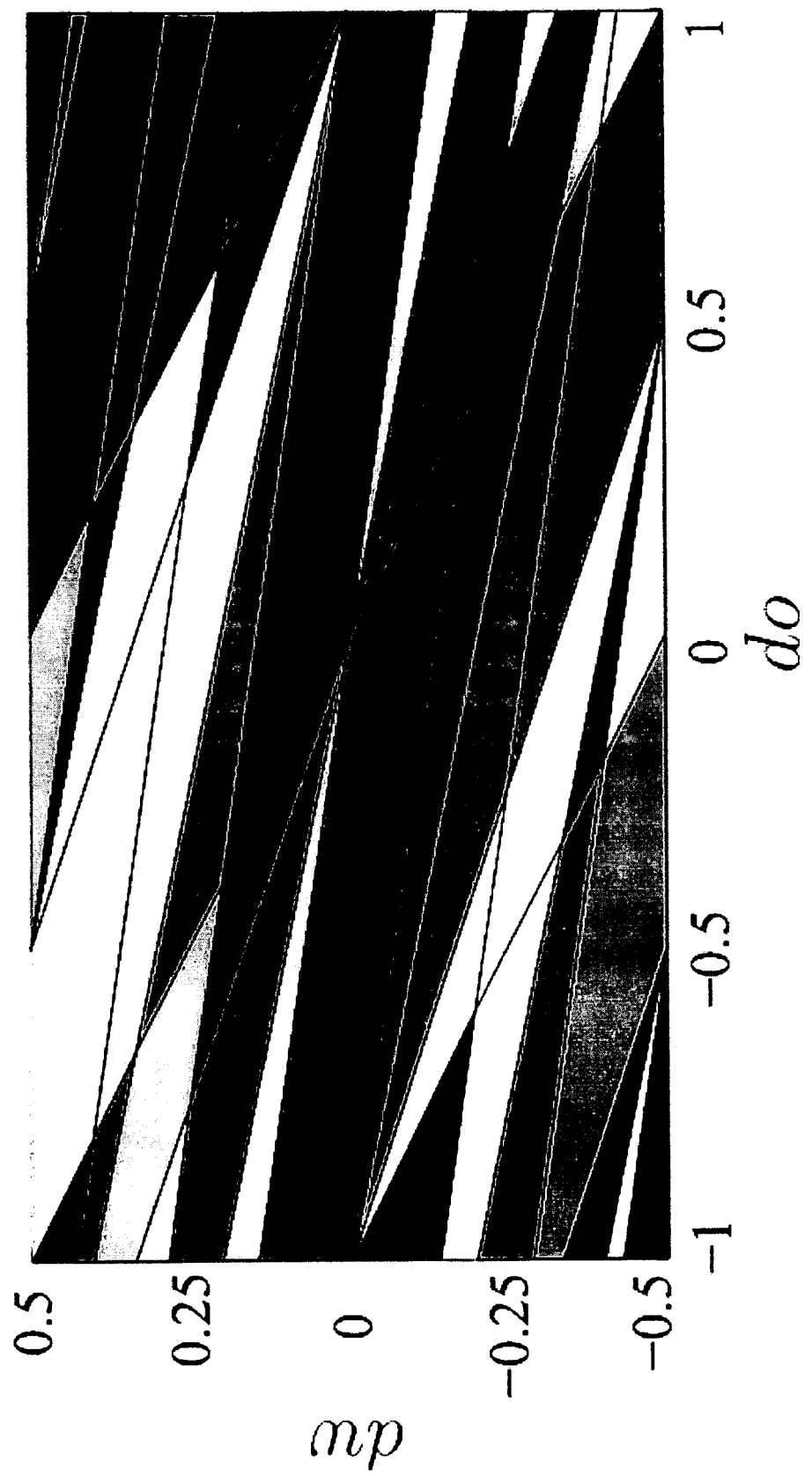
FIGS. 5A-E show examples according to an embodiment of the present invention the space ($d_o, d_w$) can be broken into polygons in which the conditional likelihoods $p_k(I|o,w)$ are constant. Plot (5A) shows this partition for symbol '2', for which $\{r_i^2\}$ is $\{2,1,2,2\}$. Each one of the four bars in a symbol defines a set of parallel lines in the space ($d_o, d_w$); for example, when the values of ($d_o, d_w$) in plot (5B) cross one of the dashed lines, the right boundary of the first bar crosses a pixel and, therefore, the likelihood changes. Plots (5C)-(5D) show by dashed lines the sets of parallel lines corresponding to bars 2-4. The equations for these lines are easily computed; for the third bar (plot (5D)), for instance, we can write.
Figure 5B:
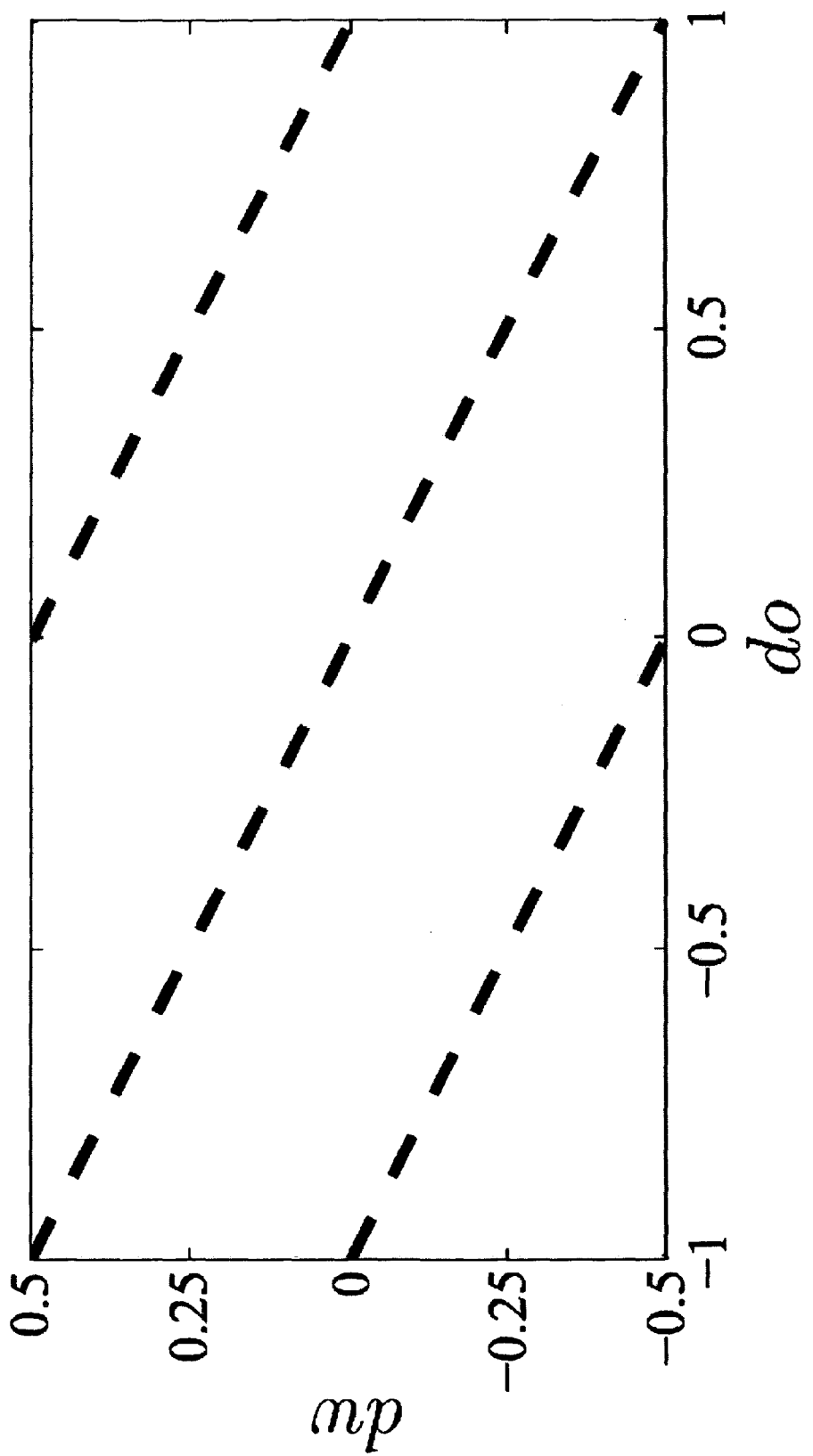
Figure 5C:
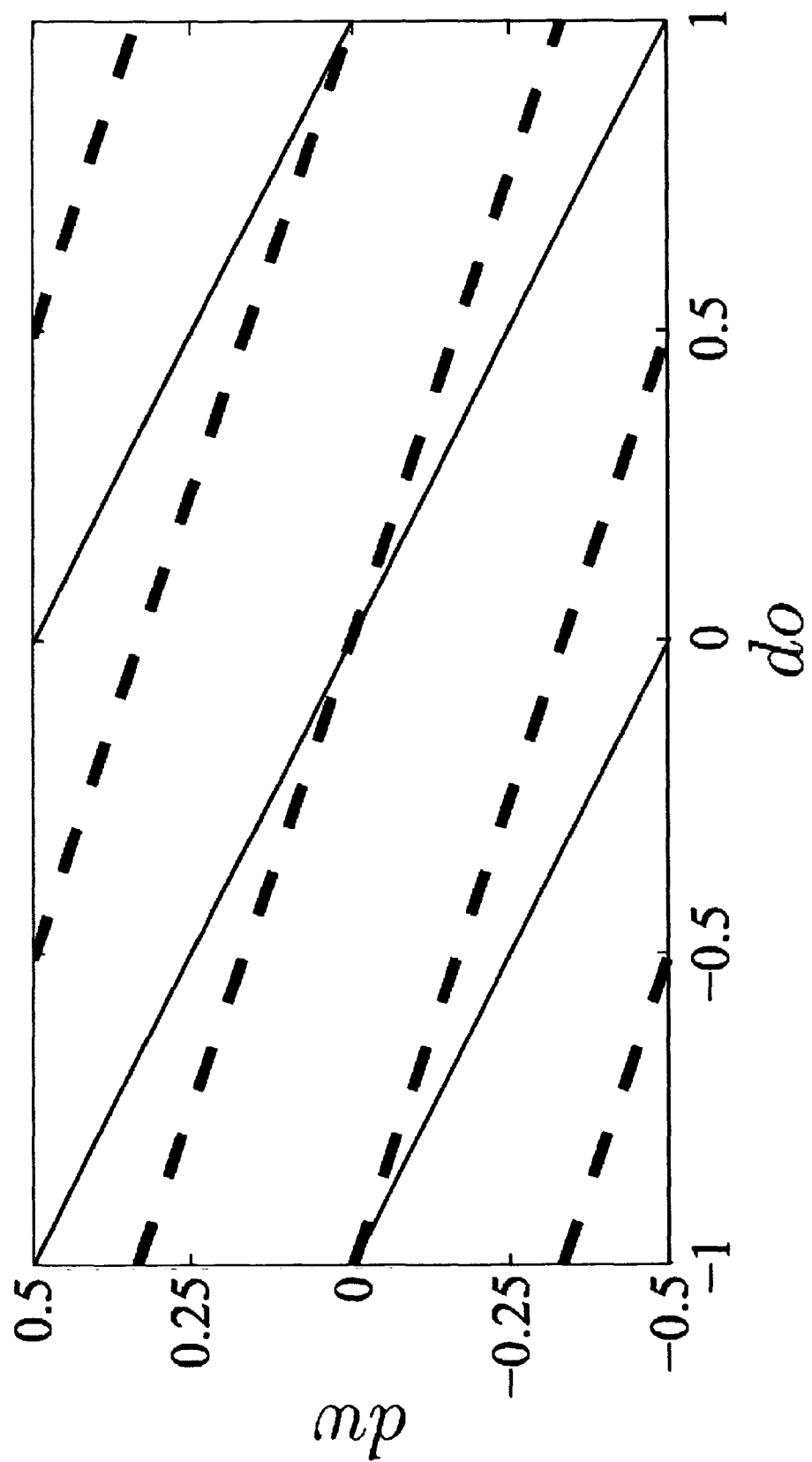
Figure 5D:
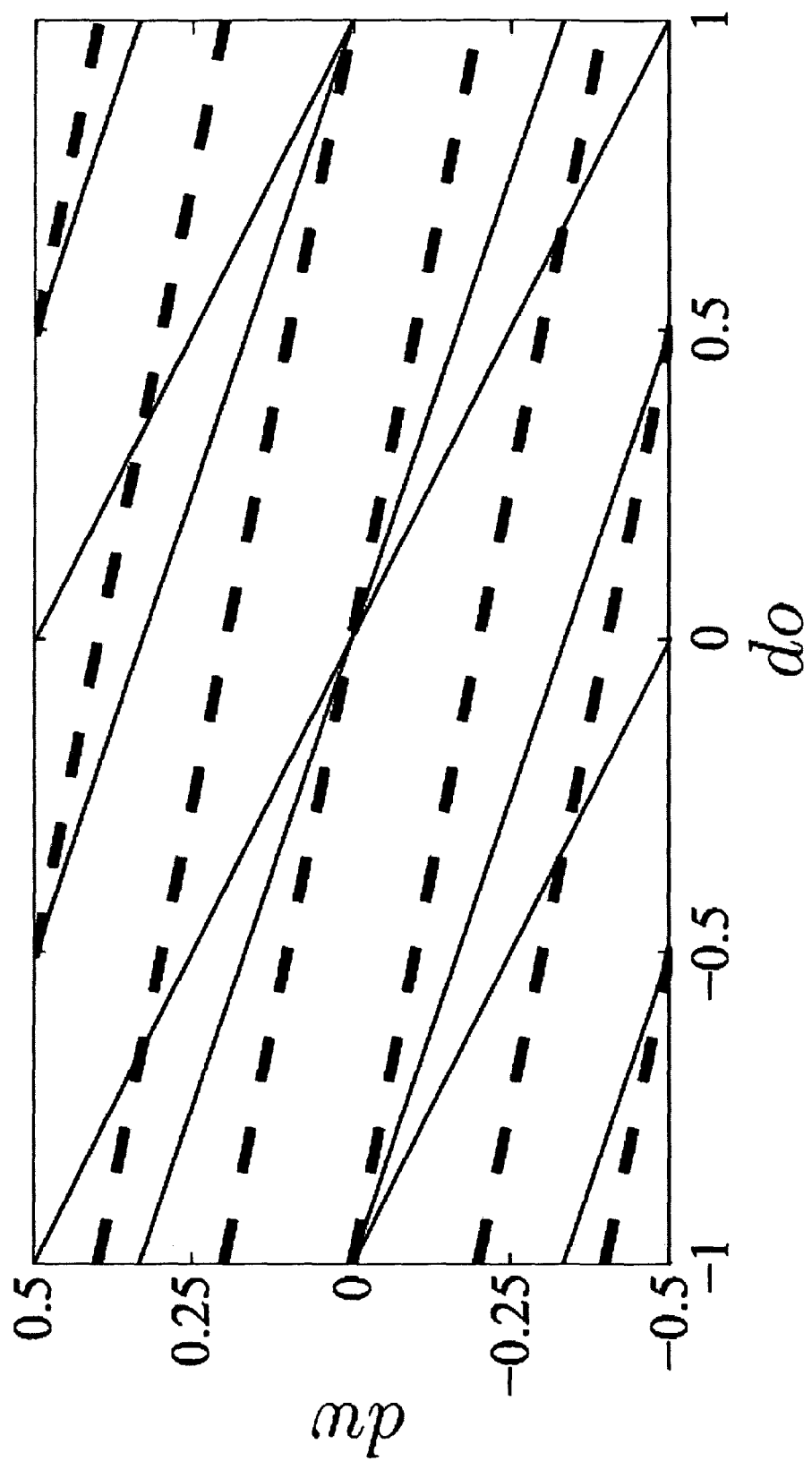
Figure 5E:
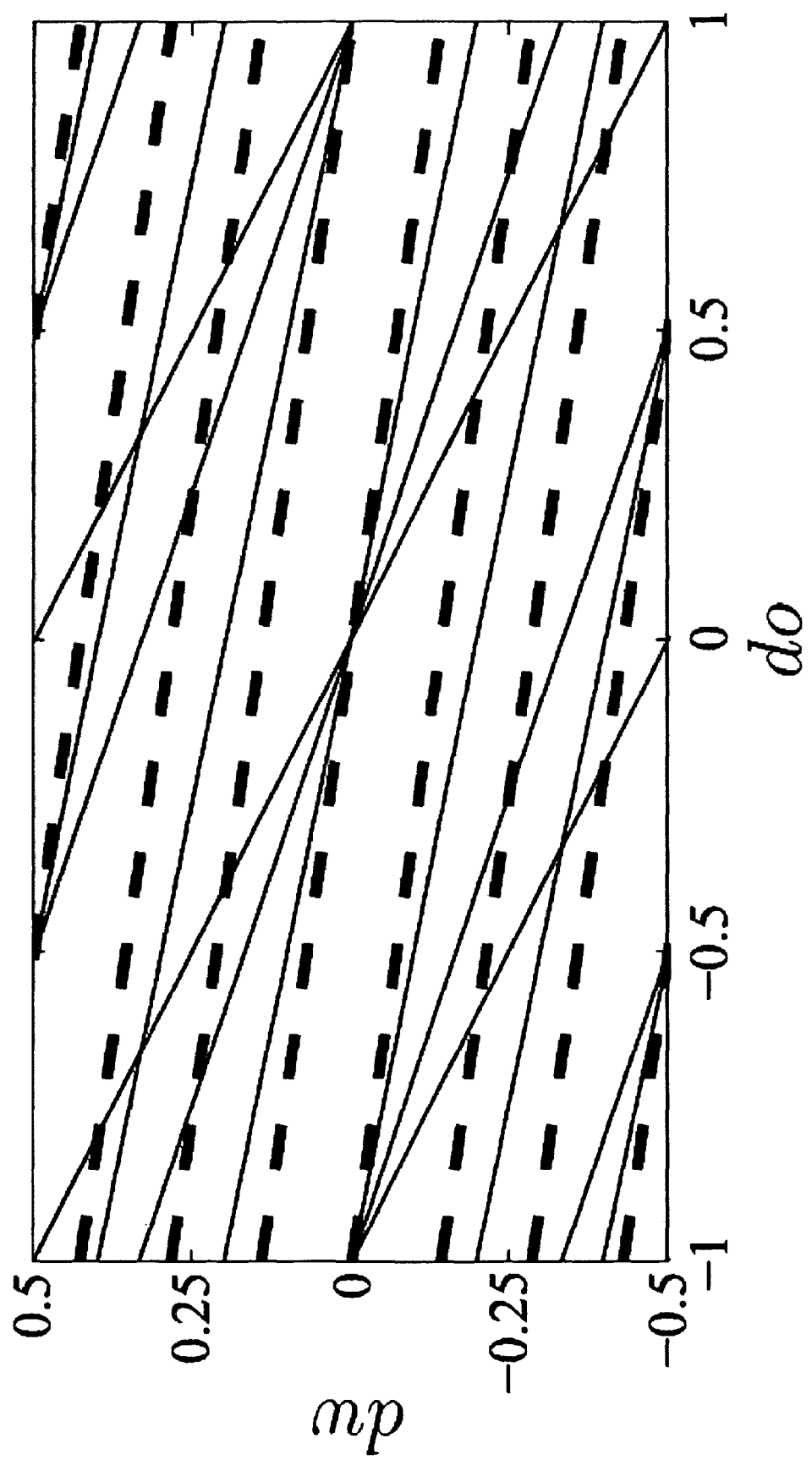

A parameterized model is a shifted and scaled (deformed) version of the original model:

$$\mathcal{M}_{o,w}^k(x) = \mathcal{M}^k((x-o)/w), \quad (4)$$

where o represents the starting point of the pattern and w represents the base width. (Note that models are functions of the continuous line, while the observation I(n) is defined over the discrete space of pixels.) An example of deformed model is shown in FIG. 4.

Digit Segment—Conditional Likelihood

Once the barcode has been localized in the image, and the endpoints $(o_L, o_R)$ of the selected scanline have been estimated, the approximate position of each digit segment of the barcode is computed. More precisely, the j-th digit segment in the left side of the barcode is assumed to start at $$o = o_L + 3w + 7w(j-1), \quad (5)$$

where:

$$w = \frac{o_R - o_L}{95} \quad (6)$$

and w is the estimated base width. These expressions derive from the fact that the overall length of the barcode is (ideally) equal to 95 times the base width, that each digit occupies a segment, or support, equal to 7 times the base width, and that the first 3 bars are guard bars.

We should note that, for a generic digit being considered, the value of o as computed in Eq. (5) could be an incorrect estimate of the actual left edge of the digit segment, as a consequence of error in the estimation of the endpoints ($o_L$, $o_R$) together with image distortion as due, for example, to perspective. However, suppose for a moment that the estimated location o and minimum bar width w are indeed correct. Then, to read the value of the digit, we could compare the intensity I(n) within the segment with the models $\mathcal{M}_{o,w}^k$ for 0≤k≤9, and pick the model that best fits the data. More precisely, we define the likelihood of the intensity within a generic digit segment for symbol k (conditioned on o and w) as $$p_k(I \mid o, w) \propto e^{-D(I, \mathcal{M}_{o,w}^k)}, \qquad (7)$$

where I(n) represents the intensity profile of the considered scanline. The log-likelihood term D can be expressed as $$D(I, \mathcal{M}_{o,w}^k) = \sum_{n=\lceil o-w \rceil}^{\lfloor o+8w \rfloor} D(I(n), \mathcal{M}_{o,w}^k(n)), \qquad (8)$$

where the variable n takes on only integer values (see FIG. 4). Note that this sum is computed over all pixels that fall within the segment [o−w, o+8w], which is the support of $\mathcal{M}_{o,w}^k(x)$.

A variety of functions can be considered for the log-likelihood D modeling the discrepancy between model and observation. We use the following robust formulation, which gave good results in our experiments. First, the quantities $\mu_w$ and $\mu_b$ representing the mean of the largest 50% and smallest 50% values of I(n) are computed, along with their variance $\sigma^2$. Then, $$D(I(n), -1) = \frac{[\max(I(n) - \mu_b, 0)]^2}{2\sigma^2} \qquad (9)$$

and $$D(I(n), 1) = \frac{[\min(I(n) - \mu_w, 0)]^2}{2\sigma^2}. \qquad (10)$$

This function penalizes values of I(n) that are small when $\mathcal{M}_{o,w}^k(n)=1$ or large when $\mathcal{M}_{o,w}^k(n)=-1$. Note that this is not equivalent to binarizing the data. Indeed, the original value of I(n) can be recovered from D(I(n), −1) and D(I(n), 1).

Digit Segment—Total Likelihood

To compute the likelihood of an observed scanline for given symbol, it is necessary to take the uncertainty about o and w into consideration. This uncertainty derives from the finite tolerance on the estimation of $o_L$ and $o_R$. Assume for example that both $o_L$ and $o_R$ are computed with a tolerance of ±Δo. Then, barring deformations or perspective effects, o has a tolerance of ±Δo as well, whereas w has a tolerance of ±2Δo/95.

We approach this problem by first defining a probability density function p(o,w) over the space of deformations. We then compute the total likelihood $p_k(I)$ by averaging $p_k(I|o,w)$ over such density:

$$p_k(I) = \iint p_k(I|o,w) p(o,w) do\, dw. \qquad (11)$$

Computing this integral may seem like a daunting task, especially if it needs to be performed in real-time by an embedded system such as a cellphone, however, the contrary is true. We show that due to the particular nature of the model $\mathcal{M}^k$, and assuming a simple form for the prior p(o,w), the integral in Eq. (11) can be computed exactly via numerical means with reasonably small complexity.

Our derivation exploits the fact that $D(I, \mathcal{M}_{o,w}^k)$ is piecewise constant in the (o,w) space. This, in turn, is due to the very nature of the scanline which is itself piecewise constant: if the change in o and w is small enough, none of the boundaries $d_i$ will "jump" to a different pixel. If we break up the sum in Eq. (8) into six pieces, corresponding to the segments in which $\mathcal{M}_{o,w}^k(x)$ takes on constant values of 1 or −1, we noticed that, within segment $[d_i, d_i+1]$, where $d_i = o + w\sum_{l=0}^{i} r_l^k$ for $0 \le i \le 5$ and having set $r_0^k = -1$ and $r_5^k = 1$, the function $\mathcal{M}_{o,w}^k(x)$ is identically equal to $(-1)^i$.

$$D(I, \mathcal{M}_{o,w}^k) = \sum_{i=1}^{5} A_i, \text{ with} \qquad (12)$$

$$A_i = \sum_{n=\lceil d_{i-1} \rceil}^{\lfloor d_i \rfloor} D(I(n), (-1)^i). \qquad (13)$$

Hence, a variation of o or w determines a change of $A_i$ (and therefore of $p_k(I|o, w)$) only when it causes $d_i-1$ or $d_i$ to cross over an integer value. Consequently, $p_k(I|o, w)$ is piecewise constant, and the integral in Eq. (11) can be computed exactly as a sum of a few dozen terms. Next, we show how to compute the terms in this sum.

Let $\{\mathcal{V}_k^t\}$ be the minimum partition of the (o,w) plane such that $p_k(I|o,w)$ is constant within each cell $\mathcal{V}_k^t$ (with t representing the index of cells in the partition). Then $$p_k(I) \propto \sum_t e^{-D_t} \iint_{V_k^t} p(o, w) do\, dw, \qquad (14)$$

where $D_t = D(I, \mathcal{M}_{o,w}^k)$ for any (o,w) in $\mathcal{V}_k^t$. Note that the cells $\mathcal{V}_k^t$ are polygonal, as they are defined by the lines of equation $o + w(\sum_{l=1}^{i} r_l^k - 1) = q$, where q is any integer, and i is any integer between 1 and 4 (see FIGS. 5A-E). The list of cells $\{\mathcal{V}_k^t\}$, as well as the integral of p(o,w) within each cell, can be computed offline and stored for online use. In fact, one can easily see that the cells form a periodic pattern (with period equal to 1 both in o and w), hence only the cells within such a period need to be stored.

Regarding the implementation of this procedure, the following observations are could be made:

1) The computation of the likelihood in Eq. (14) can be sped up by precomputing the sequences D(I(n), 1) and D(I(n), −1). Then, for each cell, one only needs to add together selected samples from the two sequences. Suppose that Eq. (11) requires summing over $N_j$ cells. For each cell $\mathcal{V}_{j,k}^t$, the negative log-likelihood $D_t$ needs to be computed, which requires two additions and two multiplications per sample. Overall, $2N_j$ additions and $2N_j$ multiplications per sample. However, it can be easily seen that by precomputing D(I(n), 1) and D(I(n),−1), each computation of $D_t$ only requires one addition per sample. This reduces the computational weight to $2+N_j$ additions and 4 multiplications per sample.

2) At run time, a specific set of cells could be chosen from the list based on the tolerance Δo and Δw on the estimated values of o and w, which are easily derived from the tolerance of the estimated endpoints $o_L$ and $o_R$. More precisely, we compute the sum in Eq. (14) over the cells that intersect the rectangle with sides [o−Δo, o+Δo] and [w−Δw, w+Δw], where o and w are estimated as by Eq. (5).

3) The integration of p(o, w) within each cell results particularly simple if p(o, w) is assumed to be uniform within the considered rectangle in the (o, w) space. In this case, the integral is proportional to the area of the polygonal cell, which can be easily computed and stored offline. In our implementation we made use of this simple, yet effective model.

It could also be useful to estimate, for each possible symbol k, the deformation parameters (o, w) given the intensity profile I(n) within a digit segment. We choose the least squares estimator $(\bar{o}_k, \bar{w}_k)$ of these quantities (under the density p(o, w)), which is given by the conditional expectation. Using Bayes rule, this is equivalent to $$(\overline{o}_k, \overline{w}_k) = \int\int (o, w) \frac{p_k(I \mid o, w)p(o, w)}{p_k(I)} dodw \propto \qquad (15)$$

$$\frac{1}{p_k(I)} \sum_t e^{-D_t} \int\int_{\mathcal{V}_k^t} owp(o, w) dodw.$$

The integrals in the above equation can be precomputed and stored for online use. If the assumption of uniformly distributed (o,w) is made (as in point 3 supra), then the terms in the sum are the centroids of the cells $\{\mathcal{V}_k^t\}$.

Imposing Spatial Coherence

We make the initial assumption that the digit segments are equally spaced (see Eq. (5)-(6)). This also implies that the base width w is constant across the barcode. In practice, one should expect that the digit segment length may vary from segment to segment, generally within the confidence intervals $\Delta o$ and $\Delta w$. Ideally, however, the segment representing a given digit in the scanline (as computed from the estimates ($\overline{o}_k$ and $\overline{w}_k$) should be adjacent to (but non overlapping with) the neighboring segments. The choice of an incorrect value of k due to single-digit analysis is likely to result in a supported segment that does not fit well together with the other segments (see FIG. 6). This observation can be exploited by imposing a global constraint as follows.

Suppose that the j-th digit takes value k(j). (Note that we need to make the dependency on j explicit in our notation from now on.) The estimated deformation parameters ($\overline{o}_{j,k(j)}$, $\overline{w}_{j,k(j)}$) define the supported segment $[\overline{o}_{j,k(j)}, \overline{o}_{j,k(j)} + 7\overline{w}_{j,k(j)}]$. We define the overlap/gap extent between the j-th and (j+1)-th estimated digit segments as $$O_{j,k(j),k_{j+1}} = |\overline{o}_{j,k(j)} + 7\overline{w}_{j,k(j)} - \overline{o}_{j+1,k(j+1)}|. \qquad (16)$$

Now define a global cost function as follows:

$$C(\{k\}) = \sum_j \alpha O_{j,k(j),k(j+1)}^2 - \log p_{j,k(j)}, \qquad (17)$$

where $\alpha$ is a balancing parameter, and the sum extends to all digit segments in the left and right half of the barcode. ($\alpha$ was set to be equal to 0.1 in our exemplary experiments). The cost function in Eq. (17) penalizes sequences of symbols that create large overlaps or gaps between two consecutive digit segments or that produce low values of likelihood. Dynamic programming can be used to minimize the cost function C over the space of sequences $\{k\}$ of symbols. FIG. 7 shows the outcome of the application of this technique.

Appendix: UPC-A Barcodes—Syntax

UPC (Universal Product Code) is a technology to encode numbers with 12 decimal digits (symbols) as an alternating sequence of black bars and white bars (spaces) with different widths. (The last digit is an error correcting check digit.) Each bar may have width equal to r×w, where r (the module width) is an integer between 1 and 4, and w, the base width (sometime called X-($r_1^k, r_2^k, r_3^k, r_4^k$) dimension), is the width of the narrowest bar. The code is divided into two halves separated by a sequence of three spaces and two bars (central guard bars), all of unitary module width. At the two ends of the barcode there is a sequence of two bars separated by a space, all of unitary module width (lateral guard bars). The lateral guard bars are sided by a space of width equal to at least 9 times the base width (quiet zone), although this requirement is sometimes violated in real-world instances. Between the lateral and central the guard bars, the code is divided into 6 equally spaced digit segments, or simply digits, each of which with length equal to 7 times the base width. Thus, the overall length of the barcode is equal to 95 base widths. Each digit represents one symbol as a sequence of two spaces and two bars. The value k of a symbol is encoded by the sequence of module widths of the bars and spaces in the digit segment. The standardized UPC-A sequences for the left half of the code are shown in FIG. 3. In the right half of the code, the same sequence of widths is used to encode a symbol, however the role of spaces and bars is inverted.

What is claimed is:

1. A method of decoding a barcode, comprising:
    (a) obtaining a digital image of a barcode with a camera; and
    (b) one or more processors receiving said digital image of said barcode and performing the steps of:
        (i) representing said digital image of said barcode in a non-binarized intensity profile, wherein said non-binarized intensity profile is defined along a scan line projected normally across a length of the barcode by the camera;
        (ii) decoding said non-binarized intensity profile by matching said non-binarized intensity profile with one or more binary code templates, wherein each of said binary code templates is a continuous piecewise constant function that alternates in a binary fashion between non- zero maximum and minimum values, p and q, respectively, wherein said matching is accomplished by shifting and scaling said one or more binary code templates along said scan line with respect to said non-binarized intensity profile, and wherein each of said one or more binary code templates represents a single digit of said barcode, and wherein said matching is performed across all digits of the barcode; and
        (iii) outputting said decoded barcode.

2. The method as set forth in claim 1, wherein said decoding further comprises maximizing the likelihood that said shifting and scaling of said one or more binary code templates fit said non-binarized intensity profile.

3. The method as set forth in claim 1, wherein said representing said non-binarized intensity profile further comprises segmenting said non-binarized intensity profile into barcode digits and wherein said matching comprises segmenting said binary code templates into binary code template digits and matching said binary code template digits to match said barcode digits.

4. The method as set forth in claim 3, wherein said decoding further comprises maximizing the likelihood that said shifting and scaling of said binary code template digits fit said non-binarized intensity profile of said barcode digits.

5. The method as set forth in claim 3, further comprising enforcing spatial coherence of said matched barcode digits over said barcode to produce a sequence of barcode digits and by minimizing overlap or gaps between said matched barcode digits.

* * * * *